United States Patent Office 3,561,029
Patented Feb. 9, 1971

3,561,029
NONCONSUMABLE ELECTRODE FOR ELECTRIC ARC HEATING AND MELTING AND METHODS
Armin M. Bruning, Pittsburgh, Pa., assignor to Westinghouse Electric Corporation, Pittsburgh, Pa., a corporation of Pennsylvania
Continuation-in-part of application Ser. No. 407,332, Oct. 29, 1964. This application Oct. 14, 1969, Ser. No. 866,274
Int. Cl. H05b 7/06
U.S. Cl. 13—18                                    19 Claims

ABSTRACT OF THE DISCLOSURE

An electrode especially suitable for use in an arc furnace where the arc current may be of the order of several thousand amperes includes a fluid cooled tip forming an arcing surface, a tip supporting structure including fluid passageways for bringing fluid to and conducting fluid from the tip, and magnetic field producing means mounted near the arcing surface for causing the arc to move substantially continuously over the arcing surface in repetitive paths in a closed track formed by an annular configuration of the tip. A sufficiently large surface area is cooled at a sufficient rate to remove heat flux resulting from integrated arc spot losses which are a function of arc current, as well as heat flux resulting from radiation and convection, and maintain a desired average arcing surface temperature, taking into consideration the wall thickness between arcing surface and water surface, and the thermal conductivity of the material. A sufficient force which is a function of arc current and magnetic field strength is exerted on the arc to move the arc at a sufficient speed which produces an arc spot dwell time so short that the instantaneous rise at the site of the arc spot above the average surface temperature does not result in deterioration of the arcing surface at an excessive rate.

CROSS-REFERENCE TO RELATED APPLICATIONS

This applicataion is a continuation-in-part of application Ser. No. 407,332, filed Oct. 29, 1964 now abandoned.

This invention relates to improvements in furnaces and heating means therefor, suitable for ore reduction and many other furnace applications, and more particularly to an electric arc furnace and a new and improved nonconsumable electrode for use therein, the new and improved nonconsumable electrode also being suitable for use in an arc chamber for heating gases, and offering special advantages when so used.

In the present state of the electric arc furnace art, carbon and graphite electrodes are used for electric arc furnaces of the submerged arc type, the direct arc type and the indirect arc type. In the direct arc furnace the majority of the power input to the furnace is concentrated in an arc spanning between the electrode and the material to be heated, called the melt. In the indirect arc furnace the arc spans between two electrodes; in this case the material to be heated does not form one of the electrodes as is the case in the direct arc furnace. In the submerged arc furnace, the electrode is submerged in the material to be heated, and the heat input to the bath takes place through resistance heating, as well as through a large number of small arcs spanning between the electrode and the material to be heated, and between particles of the material itself.

In all of the above cases the carbon or graphite electrode material is used up through oxidation, or sublimation, or chemical action with the material to be heated, or through breakage. For example, a steel melting furnace of the direct arc type employing three graphite electrodes and capable of producing at a rate of 15 tons per hour, will use between 10 and 20 pounds of graphite electrode per ton of steel produced. If the electrode cost is 28¢ per pound, the cost per hour is about $42.00, or $1,000 per day of furnace operation. Furthermore carbon and graphite electrodes must be constantly replaced as the electrodes are used up. Furnace down-time necessary for adding to the electrodes, slipping the electrodes in their holders, or for removing broken pieces of electrode from the furnace can represent a considerable loss of production estimated as 2% to 3% of the operating time.

It has occurred to others in the past that it would be desirable to have an electrode which would not be consumed during the operation of an arc furnace. Some have discarded the idea as unworkable on the theory that it would be impossible to make an electrode which would not soften and ultimately liquefy or vaporize, with the material of the electrode running down into the furnace and contaminating the melt. Certain attempts to make a nonconsumable electrode have failed because those making the attempt did not realize or understand certain essential relationships which exist and which impose requirements which must be met, these essential relationships relating, generally speaking, to materials and rate of cooling thereof, the power of the arc, and the strength and location of the magnetic field provided to continually move the arc.

More specifically, in many instances those attempting to devise a nonconsumable electrode suitable for use in an arc furnace did not recognize the heat transfer problems involved. In some cases too much heat was conducted away from the arc, so that no efficient arc operation was obtained. Even though attempts have been made to use a water cooled electrode in an arc furnace, such for example as in apparatus described in Pat. No. 2,871,533 to E. Swainson for "Method and Apparatus for Melting and Casting of High Melting Point Metals or Alloys," issued Feb. 3, 1959, these attempts resulted in failure for the reason that the electrode was still burned through or consumed by the arc, because the electrode face member providing the arcing surface was not composed of the proper material, or was not of the proper thickness, or both, and the electrode face member was not cooled at a sufficient rate.

In many cases there was no attempt made to move or rotate the arc, with the result that the arc quickly burned a hole in the electrode. At a somewhat later period attempts were made to move the arc by a magnetic field usually created at some distance from the arc, and the result was that the field at the arcing surface was not sufficiently strong to move the arc at a sufficient speed to prevent loss of surface material from the electrode. In some cases fields were set up but they were not at the proper place with respect to the arc. Furthermore, consideration was not taken of the fact that an arc is almost always a multiple arc, and the arc, instead of following one path, follows a number of paths, continually jumping between paths.

I am the first to realize or discover that notwithstanding the fact that the electric power of an arc furnace may be orders of magnitude greater than that of a gas arc heater, a nonconsumable electrode could be devised which would withstand the very severe operating conditions of a furnace.

I provide essential thermal insulation to protect those parts of the electrode not forming the arcing surface from being damaged or destroyed by intense heat of radiation and convection from molten metal and incandescent gases in the furnace.

As for my electrode face member, it is composed of copper, silver, aluminum or other suitable material having high thermal and electrical conductivities, and is water cooled, water being the most convenient fluid for this purpose. I provide magnetic field producing means located near the arcing surface for producing a field to move the arc. I accomplish satisfactory operation by providing for adequate heat transfer, by a meticulously proportioned electrode surface of one of the aforementioned materials of a carefully chosen and calculated thickness, with a rate of fluid flow to provide sufficient cooling for the electrode face. I energized my magnetic field producing means sufficiently to set up a field of the necessary strength, and having a needed geometrical relationship with respect to the arcing surface of the electrode face member, so as to move the arc continuously at a sufficient speed over an electrode of a sufficient size so that no spot or point on the electrode surface becomes sufficiently heated by continual reappearance of the arc at that spot to have the electrode surface appreciably deteriorate by evaporation or sublimation. The relationship between the speed of movement of the arc, and the material and dimensions of the electrode, will be set forth more fully hereinafter.

My invention is suitable for use in all types of arc furnaces including direct arc furnaces and indirect arc furnaces, and overcomes the disadvantages and limitations of consumable electrodes.

In summary, my invention includes, but is not limited to, an electrode with an arcing surface made of copper, silver, aluminum or similar non-magnetic material of high heat and electrical conductivity wherein the arc impinging on the electrode is caused to be moved continuously over the electrode surface. The average temperature of the surface of the electrode is held below the melting point of the material through water cooling of the inner wall of the electrode face member, water being forced through cooling fluid passageways therein. Movement of the arc over the electrode surface is effected by a stirring coil mounted inside the electrode near the arcing surface and driving the arc over the electrode surface through electromagnetically induced forces. I can also use a thin coating of steel or stainless steel a few mils thick and covering the copper of the electrode arcing surface.

My new and improved electric arc furnaces utilize my electrode. In my furnaces, water cooling and thermally insulating material are combined to reduce loss of heat through openings in the furnace wall necessary for passage of the electrodes, and in my new and improved vacuum furnace, the complicated apparatus required for continually readjusting the position of a carbon electrode as it is consumed, without destroying the vacuum, is eliminated.

Accordingly, a primary object of the invention is to provide a new and improved electrode for use in an arc furnace offering advantages over any now existing in the art.

Another object is to provide a new and improved electric arc furnace.

Still another object is to provide a new and improved vacuum furnace heated by an electric arc.

An additional object is to provide a new and improved nonconsumable electrode.

A further object is to provide a new and improved electrode in which the arc is moved over the electrode surface by a magnetic field produced in the electrode.

Still a further object is to provide a new and improved nonconsumable electrode in which the arcing surface of the electrode is water cooled.

These and other objects will become more clearly apparent after a study of the following specification, when read in connection with the accompanying drawings, in which.

Reference is made now to the drawings, in which like reference numerals are used throughout to designate like parts, for a more detailed understanding of the invention, and in particular to FIG. 1 thereof.

Figure 1:
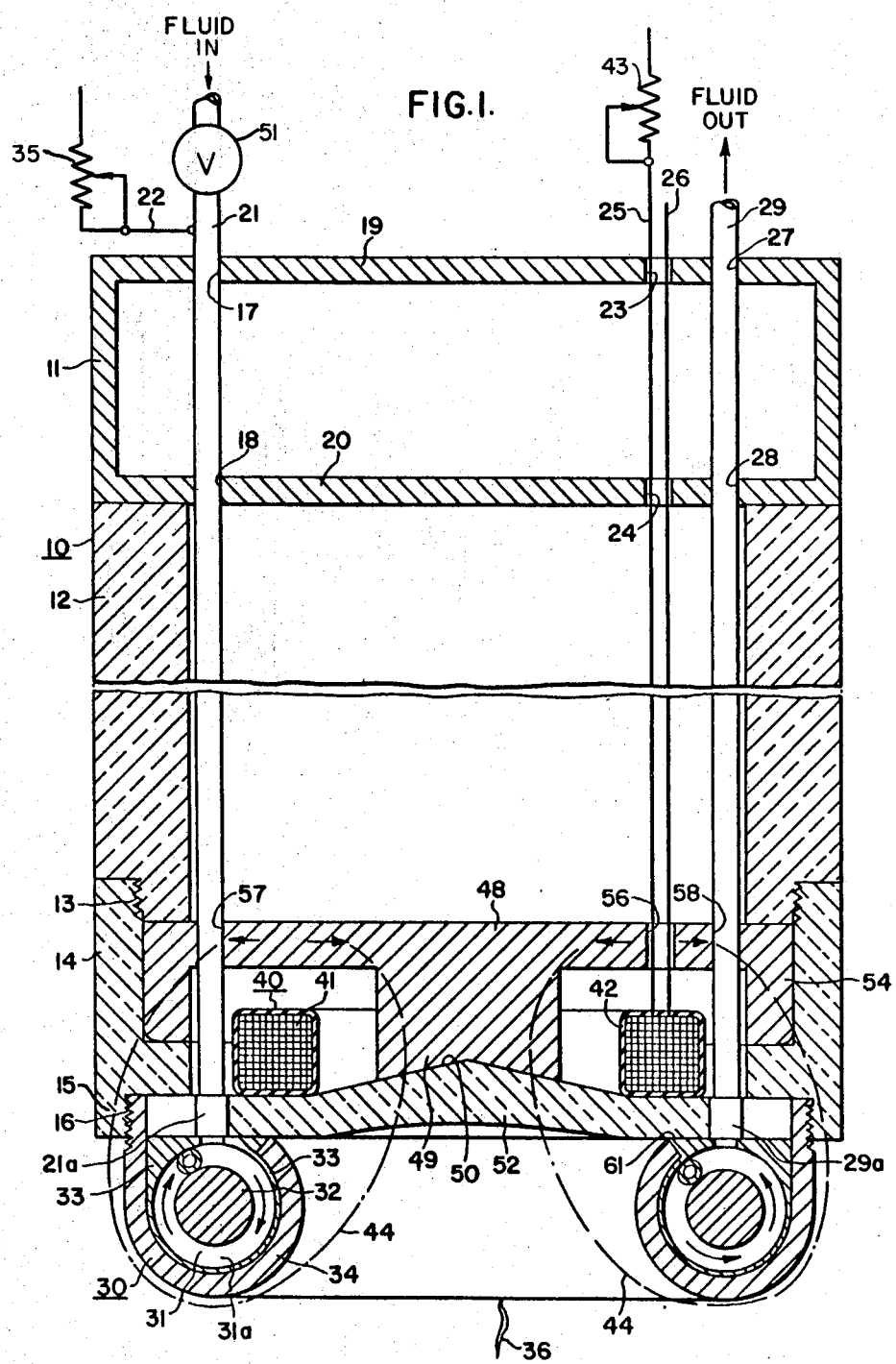
FIG. 1 is a cross-section through a nonconsumable electrode constructed according to my invention.

The essential parts of my electrode, as revealed in the drawing, are (1) an electrode face member adapted for fluid cooling, which is preferably annular in shape and composed of a non-magnetic material, having high thermal and electrical conductivity; (2) means for setting up a magnetic field of predetermined direction with respect to the arcing surface of the electrode face member and of at least a predetermined strength, the magnetic field producing means being a coil disposed within the electrode; (3) an elongated supporting structure containing means forming passageways for bringing a cooling fluid to the electrode face member and conducting fluid from the face member, at least a portion of the supporting structure being of electrically conductive material electrically connected to the electrode face member, the conductive portion of the supporting structure being adapted to have a source of potential connected thereto to produce an arc at the arcing surface of the electrode face member; and (4) heat shield means, including an elongated sleeve or covering, which may be composed of a suitable ceramic, around at least a portion of the supporting structure which would otherwise be exposed to heat of radiation or convection. In my invention as illustrated in FIG. 1 the heat shield forms part of the supporting structure, the fluid conduits also providing some support. The heat shield means further includes enclosing means, which may be composed of a suitable ceramic, closing the central circular space of the annular electrode face member and shielding the central portion of the end of the electrode from heat of radiation and convection from the arc and incandescent gases adjacent thereto.

The supporting structure generally designated 10 is seen to include a preferably cylindrical or annular head or cap member 11 having at least partially closed ends 19 and 20 and preferably composed of metal to which is secured by any convenient means, not shown, an elongated sleeve preferably cylindrical in shape and composed of a highly heat resistant material such for example as a ceramic. Preferably the lower end of the sleeve 12 is threaded at 13 where another threaded portion 14 or threaded extension of the heat resistant sleeve is attached, the threads 13 facilitating the assembly of the electrode, the lower sleeve portion 14 having an axially extending annular lip portion 15, the inner surface of which is threaded at 16, and disposed in threaded engagement therein is an electrode face member or electrode tip generally designated 30, to be described in greater detail hereinafter.

The head or cap portion 11 is seen to have aligned bores 17 and 18 in the upper and lower cover portions 19 and 20 through which passes a conduit 21 composed of copper or other suitable conductive material for bringing a cooling fluid to the electrode face member, and it is seen that conduit 21 has lead 22 connected thereto, the lead being connected to a source of potential to produce the arc, the conduit 21 being electrically connected to the electrode face member, as will be seen hereinafter. Rheostat 35 in lead 22 symbolizes means for adjusting the current in arc 36. Aligned bores 23 and 24 in head end portions 19 and 20 have leads 25 and 26 passing therethrough and insulated therefrom, leads 25 and 26 being adapted to be connected to a suitable source of direct current potential for energizing coil means to set up a magnetic field, as will be explained more fully hereinafter. Rheostat 43 in lead 25 symbolizes means for adjusting the current in coil 41 and thereby adjusting the strength of the magnetic field indicated at 44. Aligned bores 27 and 28 have an additional conduit 29 preferably composed of copper or other suitable material passing therethrough for conducting the cooling fluid from the aforementioned electrode face member 30 after heat has been transferred from the face member to the fluid.

Valve 51 in fluid inlet conduit 21 symbolizes means for adjusting the mass flow rate of the cooling fluid in the electrode face member or tip generally designated 30.

The aforementioned electrode face member generally designated 30 is as previously stated in threaded engagement with threads 16 in the extended annular lip portion 15 of ceramic sleeve portion 14. The electrode face member 30 is composed of nonmagnetic material and is preferably composed of copper or other material having a high thermal conductivity, and is generally annular or ring shaped. The electrode face member has spiral passageways extending therethrough all the way around the electrode face member with conduits 21 and 29 joining the spiral passageways in the electrode face member at positions substantially 180° apart, so that water or other cooling fluid entering the electrode face member from conduit 21 follows two generally semi-circular paths to reach the exit conduit 29, it being understood, of course, that each of these generally semi-circular paths is spiral in shape, as shown. One of these generally semi-circular spiral passageways is shown and is designated 31.

In the construction of the electrode face member the portion shown of the spiral passageway may be formed by a spiral portion of copper tubing 31a similar to that forming conduit 21; the electrode face member may be formed generally after the manner taught in a Pat. No. 3,097,321 to C. E. LeRow, Jr. et al., for "High Energy Arc Electrodes," issued July 9, 1963, and assigned to the assignee of the instant invention. The portion of the electrode face member shown at 32 may be a snugly fitting semicircular filler rod composed of copper; portion 33 may be a braze, as taught in the aforementioned patent to LeRow, Jr. et al. The outside portion 34 of the electrode face member, which forms the arcing surface, may be cast copper of a carefully calculated or chosen thickness having high heat conductivity and high electrical conductivity, or portion 34 may be prepared in any other suitable way.

Conduit 21 is threaded at 21a and in threaded engagement with conduit 31a of the electrode face member to form a fluid-tight joint, and conduit 29 is threaded at 29a to form an additional fluid-tight threaded connection with conduit 31a of the electrode face member.

During operation, the arc tube 36 takes place between the electrode face member 30 and the melt, not shown for convenience of illustration, the potential to initiate and maintain the arc being supplied to the aforementioned lead 22 and being conducted to the electrode face member by way of conduit 21.

A third major portion of apparatus embodying my invention was stated to be means for setting up a magnetic field at the arcing surface of the electrode face member in a manner to produce substantially continuous movement of the arc in a substantially circular path at a predetermined velocity and prevent the formation of hot spots with resulting metal evaporation from, or burning through of, the electrode face member. I provide a field producing means 40 for producing the aforementioned magnetic field illustrated symbolically by flux lines 44, including an annular coil 41 with a housing 42 having the aforementioned leads 25 and 26 connected thereto for bringing an energizing potential to the coil. Preferably, leads 25 and 26 are connected to a source of direct current potential, and it will be noted that the lines of force of the magnetic field 44 set up by the coil are substantially perpendicular to the current path of the arc 36 as well as being transverse to the path of travel of the arc, and the interaction of the arc current and the magnetic field creates a force substantially perpendicular to both the direction of current and the magnetic field, the force being in a direction to cause the arc 36 to rotate substantially continuously around the annular surface of the electrode. An additional portion of my apparatus for setting up the aforementioned magnetic field 44 is an annular yoke member 48 which is composed of ferromagnetic material and which has an extended central portion 49 with a conical surface 50 against which conical surface snugly fits the shaped inner surface of a disc-shaped shield 52 composed of a highly heat resistant material, such as a ceramic. The aforementioned yoke member 48 also has an annular lip portion 54 extending axially and at least partially enclosing the field coil 41. The use of the yoke member 48 composed of ferromagnetic material as a portion of the magnetic field producing means provides a path of very high permeability for a portion of the magnetic circuit and little of the magnetizing force is employed in setting up a field in the yoke, so that a large portion of the magnetomotive force of the magnetic field is available for setting up a field in the desired location, that is, encircling the electrode face member and providing a field perpendicular to the arc to cause a substantially constant force to be applied to the arc which tends to rotate the same. The yoke member 48 has a bore 56 therethrough for the passage of the aforementioned coil leads 25 and 26, and yoke member 48 has bores 57 and 58 therethrough for the passage of the copper conduits 21 and 29.

As previously stated, conduits 21 and 29 preferably have sections joined as by threading in the areas 21a and 29a thereof to facilitate the assembly of the apparatus, the upper portions of the conduits 21 and 29 being inserted and turned to threaded engagement with spiralled conduit 31a of the electrode face member after the electrode face member 30 has been secured in place by threading at 16.

Fourthly, my invention was stated to include heat shield means, composed of highly heat resistant or refractory material, for shielding the portion of the structure not used for providing an arcing surface on the electrode face member, shielding these portions from the heat of radiation and the heat of convection. To this end, I provide the aforementioned sleeve portions 12 and 14 composed of a highly heat resistant material such as a ceramic, such for example as oxides of zirconium, and I provide the aforementioned disc-shaped heat shield member 52 which may be composed of the same ceramic, which supports the coil 41 and which is held in place by the abutting surface 61 of the electrode face member 30. Any suitable means, not shown for convenience of illustration, may be provided for clamping the coil 41 in the position shown, if desired.

It will be understood that the supporting structure may be of any desired length, and that if desired a reinforcing sleeve of metal disposed inside of the ceramic sleeve 12 may provide additional firm support for the electrode face member and magnetic field producing means, if additional support is necessary, so long as the metallic portion of the support, not shown for convenience of illustration, is either fluid cooled or substantially completely shielded from heat of radiation and convection from the arc 36 and other arcs that are in the furnace, or both.

In summary then, I have provided a nonconsumable electrode including an electrode face member composed of conductive material providing an arcing surface and having a cooling fluid flowing therethrough, and magnetic field producing means including a coil disposed near the electrode face member and producing, when energized, a magnetic field which causes the arc 36 from the arcing surface of the face member to rotate substantially continuously around the annular electrode face member. It will be understood that if direct current energizes the coil 41 and alternating current produces the arc 36, when the polarity of the arc current reverses each cycle, the force on the arc reverses its direction and the direction of arc rotation reverses. In addition, I provide a supporting structure including passageways or conduits 21 and 29 for the flow of a cooling fluid to the electrode face member and the flow of fluid from the electrode face member. The supporting structure is, as stated, at least partially composed of conductive material and has one terminal of a source of potential connected thereto to produce the arc 36 at the electrode face member. Further, I provide means in the form of a sleeve or tube composed of a highly heat resistant material such as a ceramic, forming part of the supporting structure if desired, for protecting the remainder of the supporting structure from the heat of radiation and convection from the arc, and I provide a disc-shaped heat shield member which prevents heat of radiation and convection from passing through the central circular space of the annular electrode face member and reaching further into the structure and damaging the material or a part thereof.

I have discovered a number of important and in some cases critical relationships which exist in an electrode, and which exist between the electrode and the environment in which it is to be used. These important or critical relationships interrelate the following quantities, both as to their transient and steady state effects:

(1) The electrical conductivity, thermal conductivity, thickness, melting point, and evaporation temperature of the material utilized in the electrode face member;

(2) Current density of the current in the arc from the electrode;

(3) Field strength of the magnetic field set up for rotating the arc, as well as the position of the field;

(4) The mean diameter of the arc path around the annular arcing surface of the electrode, and the width of the surface offering a path for the arc, and hence the area of the electrode surface exposed to heat flux;

(5) The type of coolant, the pressure of the coolant flowing in and through a cooling passageway or passageways in the electrode, and the velocity or rate of flow of fluid as well as the temperature of the fluid when entering the electrode, and the final allowable temperature of the fluid as it exits from the electrode.

For simplicity of illustration and description, important or critical relationships in my electrode will be described first with reference to a single hollow electrode operating in an arc furnace where one arc takes place between the electrode and a melt of opposite polarity. Changing the fluid passageway from the simple structure of FIG. 2 to the spiral pasageway of FIG. 1 does not materially affect certain basic considerations. Where my electrode is used in a three phase furnace it will be understood that the presence of other arcs in the enclosed furnace may have an influence upon the heat flux which must be romoved through any particular electrode.

Certain features of my electrode will first be described with reference to an arc taking place in a furnace in which it is assumed that the heat of convection of gases does not materially increase the heat flux which must be removed by the electrode. It will be understood by those skilled in the art that the heat of convection resulting from the movement of gases in a furance is quite small compared to the heat generated by the arc spot plus the heat absorbed by the electrode as a result of radiation from the arc and from the melt, and for this reason considerations of heat of convection may for all practical purposes be neglected in calculating the dimensions of a nonconsumable electrode according to my invention.

Also, the heat generated as a result of $I^2R$ losses in the electrode itself may be neglected, for even though the current may run into the tens of thousands of amperes, I employ in my electrode material of a very high electrical conductivity, such as copper, and thereby avoid the generation of substantial heat by current flow in the electrode itself.

Two separate and distinct but not unrelated considerations each sets a lower limit on the diameter of the electrode, and for reasons which will appear more clearly hereinafter, in choosing the diameter of the electrode to be employed in practicing my invention, the larger of the two diameters is the diameter selected.

A first minimum diameter for the electrode is set by the melting and evaporation temperatures of the material utilized in the electrode, and by the speed of movement of the arc as it rotates around the annular surface of the electrode, this speed being a function of both the current in the arc and the strength of the magnetic field, as will be seen more clearly hereinafter.

For arc current magnitudes contemplated, where my electrode is used for arc furance operation, the heat input to the electrode material at the arc contact spot can go to values in the order of $16 \times 10^9$ B.t.u./hr./ft.$^2$. Local heat fluxes of this order of magnitude cannot be removed from the metallic electrode surface by any known heat removal method or device. If the arc stays at one spot, or moves too slowly, practically instantaneous electrode melting and vaporization occurs. As previously stated, I contemplate the use of copper as one suitable material in forming my electrode, and at the aforementioned heat input level of 16 billion B.t.u./hr./ft.$^2$ impinging on copper, the copper surface will rise about 3000° F. in about 1 microsecond. If the arc spot diameter is about 1 millimeter, and this is a typical diameter which might normally be encountered in service, it will be seen that the arc must be moving at a velocity of about 3300 ft./sec., which corresponds to a velocity of 1 million millimeters per sec., or 1 millimeter per microsecond, to prevent the spot remaining at one position on the electrode long enough to cause serious electrode metal deterioration.

It has been known for many years that tremendous heat is generated at an arc spot, and that to avoid damage to the material, the arc has to be moved at high velocity. A discussion of this subject may be found in a paper entitled "Theory of the Deion Circuit Breaker" presented by J. Slepian at the convention of the American Institute of Electrical Engineers, New York, N.Y., Jan. 28 to Feb. 1, 1929. I am the first to discover that the principles revealed in the aforementioned Slepian paper may be related to other factors in a nonconsumable electrode, to produce an electrode which will operate in the range of 1,000 to 100,000 ampers in the environment of molten metals for many hours without being destroyed.

In the construction of my electrode, as previously stated, a minimum speed of movement, or velocity, of the arc spot is required so as not to cause damage to the electrode. It must next be decided what the minimum diameter of the electrode may be, based on this consideration alone, so that there will be no overheating if the same electrode location is hit again by the arc after the arc has moved one revolution around the electrode. It being recalled that the arc is highly erratic and jumps and changes its path at random, it will be apparent that where the electrode provides an average arc contact area, for example, one inch in width, the mathematical probability of the arc hitting the exact same one millimeter wide spot on the next revolution is rather small, but it will also be apparent that the mathematical probability of the arc hitting the same spot on at least some of its revolutions after only one revolution is almost a certainty, and in choosing the diameter of the electrode the choice is based upon the assumption that the arc spot may and will return to the exact position on the next revolution, no other assumption being feasible or possible. For the case of the aforementioned copper electrode with heat flux of 16 billion B.t.u./hr./ft.² and an arc velocity of 3300 ft./sec., the temperature of a spot or point on the surface of the electrode which the arc has moved across will drop to a safe value in about 100 microseconds. In, for example, 115 microseconds, the temperature will drop in the order of 2800° F. In 100 microseconds the arc will travel about 4.0 inches at the aforementioned velocity of 3300 ft./sec., and it is accordingly seen that if the electrode diameter in inches is thus at least 4.0/π, electrode damage due to relocating of the arc on the same electrode spot is not likely to occur. Under the illustrated conditions then the electrode must be at least 1.3 inches in diameter. This is the minimum diameter of the arc path; preferably the electrode has a greater diameter to afford an arc path of some width.

Figure 4A:
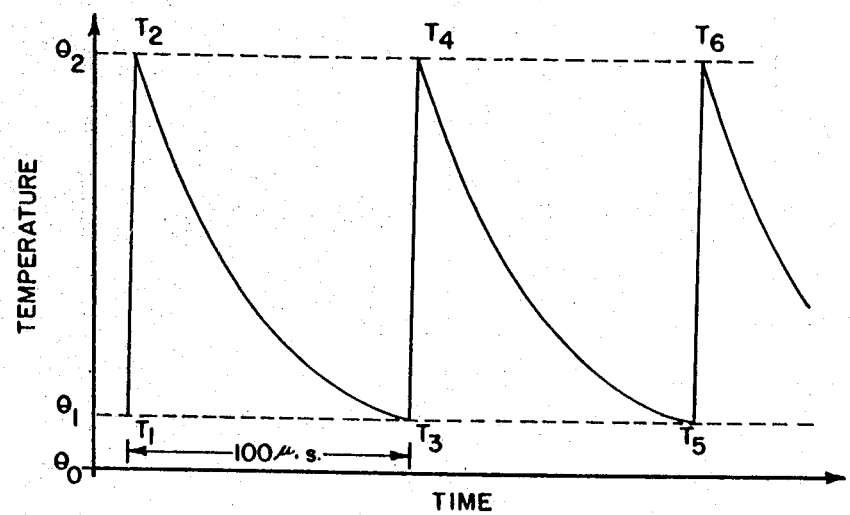
FIGS. 4A, 4B and 4C are graphs illustrating the operation of the apparatus of FIGS. 1, 2 and 3.
Figure 4B:
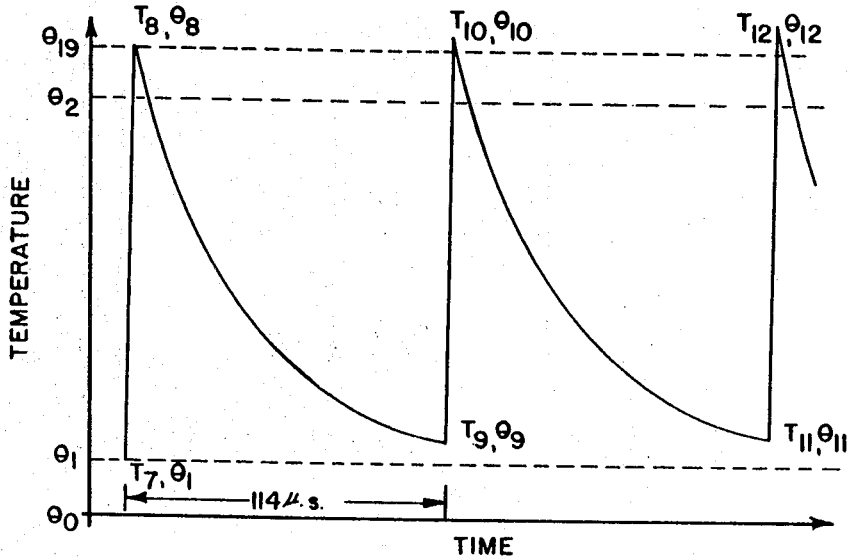
Figure 4C:
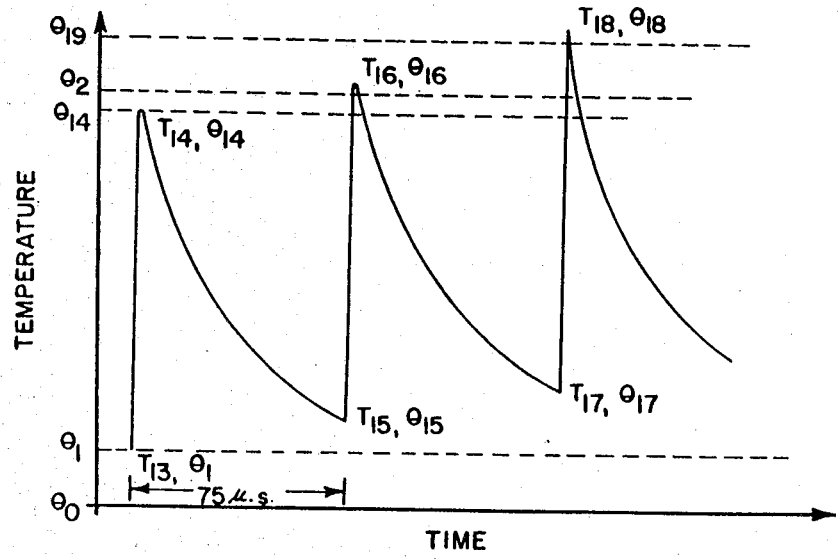

Particular reference is made to FIGS. 4A, 4B and 4C, which together illustrate the relation of certain parameters which are desirable under certain conditions of operation and in some applications. These are drawn to approximately similar time scales, and represent arc velocities of approximately 3300 ft./sec., 2900 ft./sec.; and 4400 ft./sec., respectively. In FIG. 4A it is assumed that the electrode surface is at an average temperature corresponding to $\theta_0$, and that a particular spot on the surface has a temperature $\theta_1$ somewhat greater than $\theta_0$, due to passage of the arc over the spot on some previous revolution. As will become more clearly apparent hereinafter, the average temperature of the electrode is determined in part by the current of the arc. Assuming for example a current of 20,000 amperes and a voltage drop at the electrode at 20 volts, 400 kilowatts of heat flux due to integrated arc spot losses must be removed. A certain temperature drop will take place between the arcing surface and the surface of the inner passageway through which the water flows. For a copper arcing surface ⅛ inch in thickness, the temperature drop may be of the order of 500° F., and it will be readily understood that when this heat is transferred to the cooling medium, for example, water, the temperature of the water is increased, for example, from 100° F. at entry to an exit temperature of, for example, 200° F. With 200° added to the 500° drop in the copper of the electrode and another possible 200° film drop in the water to transfer heat from copper to water, the minimum average temperature of the electrode arcing surface will be 900° F. Other factors such as heat of radiation, and heat of convection in the presence of other arcs may change the average temperature $\theta_0$ somewhat.

When FIG. 4A, where the speed or rotation of the arc is assumed to be 3300 ft./sec., and the arc path diameter about 4/π inches, the arc strikes at a particular spot at time $T_1$, in one microsecond the surface of the copper at the arc spot rises to a temperature $\theta_2$ at a time $T_2$, and in the time interval of 100 microseconds before the arc strikes again at the same spot at time $T_3$, it is seen that the temperature is returned to the original temperature $\theta_1$. At the aforementioned time $T_3$ the arc strikes again at the same point and in one microsecond the temperature is immediately raised to the temperature $\theta_2$ at the time $T_4$, the temperature thereafter falling in 100 microseconds to the temperature $\theta_1$ at the time $T_5$ at which time the arc strikes again and in one microsecond the surface temperature at that spot is raised to temperature $\theta_2$ at time $T_6$. The important feature revealed by the somewhat idealized and simplified graph of FIG. 4A is that the arc does not strike again at the same spot until the temperature at that spot has returned to its original value, $\theta_1$.

Particular reference is made now to FIG. 4B in which the speed of rotation of the arc is assumed to be reduced somewhat so that 114 microseconds elapses before the arc returns to the same spot, corresponding substantially to a speed of rotation or velocity, of 2900 ft./sec. Under these operating conditions, assuming again that at time $T_7$ when the arc first strikes a particular spot, the electrode surface at the spot is at a temperature corresponding to $\theta_1$, in 1.14 microseconds, the time which it takes an arc spot 1 millimeter in diameter to move across any point on the electrode surface, the temperature is raised to $\theta_8$ at time $T_8$. It is noted that temperature $\theta_8$ is greater in value than temperature $\theta_2$ because the arc spot now remains longer in one position on the electrode surface. Thereafter the surface temperature subsides in 114 microseconds to a temperature $\theta_9$ at time $T_9$, at which time the arc strikes again raising the temperature to a temperature $\theta_{10}$ at time $T_{10}$, it being observed that $\theta_{10}$ is somewhat more than temperature $\theta_8$, the temperature at the arc spot thereafter declining or being reduced again until at time $T_{11}$ the temperature attains a value of $\theta_{11}$ whereupon the arc hits again at the same spot raising the temperature to a value $\theta_{12}$ at time $T_{12}$. It is noted that temperature values $\theta_9$ and $\theta_{11}$ may be somewhat more than the temperature of $\theta_1$, and that temperatures $\theta_8$, $\theta_{10}$, and $\theta_{12}$ may be progressively more than temperature $\theta_2$, and the electrode temperature may reach a value considerably greater than $\theta_{19}$, which represents the evaporation temperature of the electrode material. This would normally follow from the relative slopes of the curve between $T_7$ and $T_8$, and between $T_8$ and $T_9$.

It is to be noted that the average temperature $\theta_0$ of the arcing surface is not materially affected by the speed of rotation of the arc, the average temperature being mainly determined by the heat flux and other factors, regardless of how rapidly or slowly the arc is rotated.

Particular reference is made now to FIG. 4C, which illustrates temperature conditions when the arc velocity is increased to approximately 4400 ft./sec. and a time interval of only 75 microseconds between the time the arc strikes at one spot and returns to the same spot on the next revolution. Assuming again that $\theta_0$ corresponds approximately to the average temperature of the arcing surface, and that a particular spot has a starting temperature of $\theta_1$, when the arc strikes at time $T_{13}$, on the first strike the instantaneous temperature is raised in 0.75 microsecond to a temperature $\theta_{14}$ at $T_{14}$. It is noted that temperature $\theta_{14}$ is less than $\theta_2$; the swifter moving arc does not remain on the spot long enough for the first revolution to produce a temperature rise $\theta_2$. Thereafter the surface at that particular point returns only to temperature $\theta_{15}$ when the arc strikes again. $\theta_{15}$ is greater than $\theta_1$; this results from the fact that the electrode surface has only 75 microseconds to cool off before the arc hits again. This time ($T_{15}$) the instant temperature is raised to a value $\theta_{16}$ at time $T_{16}$, it being noticed that temperature $\theta_{16}$ is greater than temperature $\theta_{14}$. The arc thereafter moves away from the spot and the temperature falls until time $T_{17}$ reaching a value of $\theta_{17}$ when the arc strikes again; this time it is noticed that the arc quickly raises the temperature in 0.75 microsecond to a value $\theta_{18}$ at time $T_{18}$, and that the temperature $\theta_{18}$ is above the evaporation temperature $\theta_{19}$ and accordingly material deterioration of the electrode quickly occurs.

In summary, once the critical arc velocity is established for a given material and length of the path the arc travels, the velocity should not be substantially increased or decreased without possible damage to the electrode. If the velocity is increased, the arc returns to the same spot too soon; if the velocity is decreased, the arc remains on any spot too long. It will be understood that the time factor in the graphs is compressed; the effects shown as happening in three revolutions may in fact require many revolutions of the arc to be produced. It should also be mentioned that there can exist multiple arc contact spots with a single main arc and that under these circumstances, that is, with multiple arc contact spots the chance of repeatedly rehitting the same electrode area with an arc is greatly increased.

Figure 2:
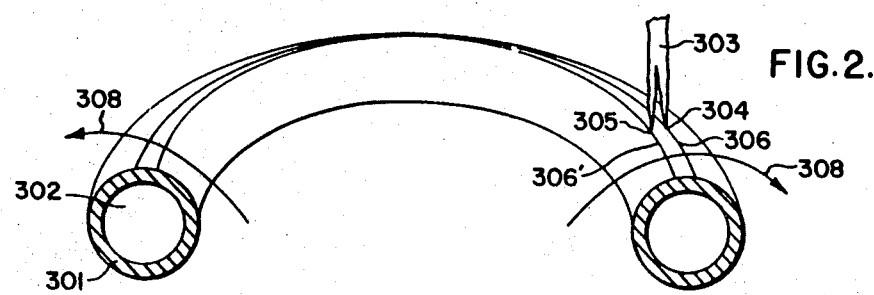
FIG. 2 illustrates the action of an arc in a nonconsumable electrode.

Particular reference is made now to FIG. 2 in which the reference numeral 301 indicates an annular electrode having an annular cross-section with a cooling passageway 302 therein. The arc is designated 303, and it is seen that the arc divides and strikes at two-spots 304 and 305, the spots respectively following paths 306 and 306' generally. The means diameter of the path may be selected, for purposes of computation, as the path of smaller diameter. The magnetic field transverse to the electrode surface and transverse to the direction of the arc is indicated by lines of force 308.

Figure 3:
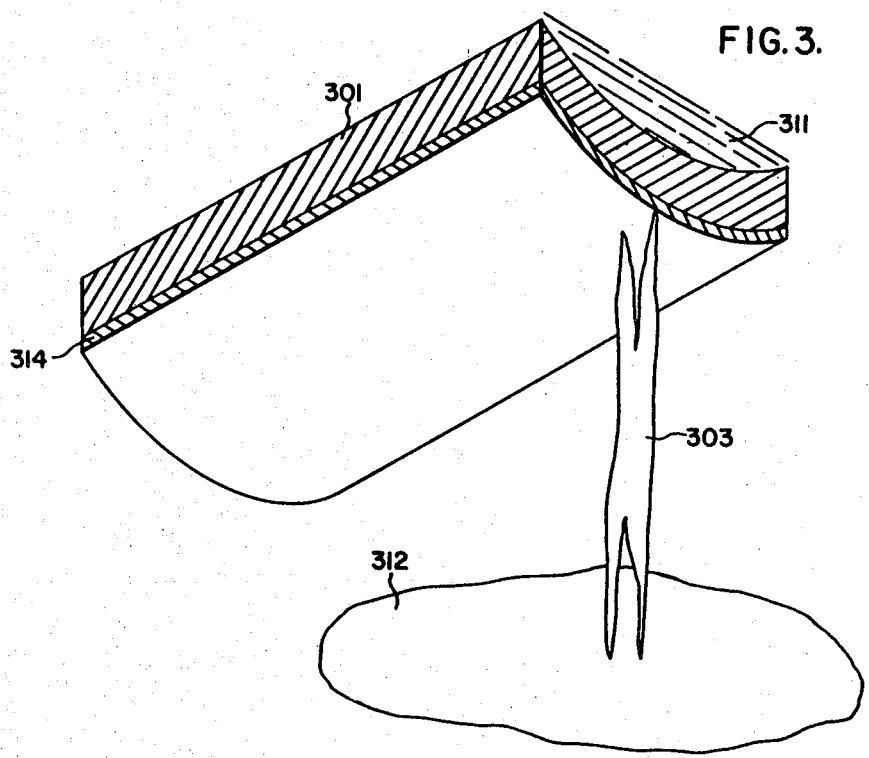
FIG. 3 shows the motion of the arc of FIG. 2 in greater detail.

Particular reference is made now to FIG. 3. A portion of the electrode is shown at 301, the coolant being shown at 311, the arc being shown at 303 taking place to the melt 312, the electrode arcing surace having a layer of partially solidified material of vapor from the melt deposited thereon, this being designated 314. The layer or carapace 314 is the normal result of operation of the electrode close to the melt of a furnace.

So far only the transient overheating from the arc spot on the electrode has been set forth. It has been shown that to prevent electrode overheating and the evaporation of material, the arc has to be moved at a high velocity. During arc spot movement only a thin layer of electrode metal is brought temporarily to a high temperature; for electrode material such as copper, a thickness of 0.05 inch is adequate from transient heating considerations.

However, it is also necessary to remove the integrated heat flux impinging on the electrode area. For an arc current of 20,000 amperes, an electrode would have to remove in the order of 400 kw. of integrated arc spot losses. It has been found in practice that heat removal rates of 20 kw./in.$^2$ are near the maximum which can be obtained, and thus an effective minimum electrode arcing area of 20 square inches would be required. Calculations of an arc diameter to provide 20 square inches of arcing surface area indicate that an annular electrode with an outer radius of 4 inches and an inner radius of 3 inches would provide approximately 20 square inches of arcing surface and would provide a mean arcing path approximately 22 inches in circumference, or 22 inches in length.

If the thickness of the copper between the electrode arcing surface area and the water cooled rear face, that is, the inner surface of the inner passageway through which the water flows, is 1/8 of an inch, the temperature drop through copper at 20 kw./in.$^2$ would be about 500° F., representing a temperature differential of this amount (500° F.) between the arcing surface and the inner wall of the fluid passageway. As previously stated, the temperature rise in the water, and the film drop to effect copper to water heat transfer would contribute to the average arcing surface temperature, making it in the neighborhood of 900° F.

In accordance with previous statements, there is required then, an electrode which is 8 inches in diameter and has an annular arcing surface approximately 1 inch in width. As a general rule, in electrodes to be used in furnaces, it is desirable to keep the area or surface of the electrode as small as possible so that a minimum of heat will be lost from the furnace by way of the electrode.

It will further be seen that increasing the electrode diameter to 8 inches, while maintaining an arc velocity of 3300 ft./sec., results in an elapsed time of several hundred microseconds between the time the arc alights on one spot of the electrode surface and returns to the same spot on the next revolution, so that the first condition for the minimum size or minimum diameter of the electrode is met when an electrode is constructed in accordance with the second requirement for diameter and arcing surface area.

I have discovered that a mathematical relationship exists between arc velocity, arc current magnitude, and magnetic field strength, and in accordance with the discovered relationship I can calculate the required field strength to obtain an arc velocity adequate to prevent electrode deterioration. I have discovered that the arc velocity is proportional to the square root of the product of arc current magnitude and magnetic field flux density. For example, to obtain an arc velocity of 3,300 ft./sec., and assuming an arc current magnitude of 20,000 amperes, I calculate that a field strength of about 6000 gauss will be required.

The formula I employ is:

$$S = k\sqrt{I \times B}$$

where

S = arc velocity (or rotational speed), ft./sec.
k = a constant having a value of 300
I = arc current, kiloamperes
B = magnetic flux density, kilogauss The value of the constant $k$ is arrived at inductively, as a result of many empirical observations and measurements made of an arc moving in gas having a density of 0.02 to 0.04 pound/cu. ft., at a pressure of one atmosphere, and temperatures of 1000° to 2000° Rankine. Such conditions might be encountered in an arc furnace. The value of $k$ varies with variations in gas density.

Figure 8:
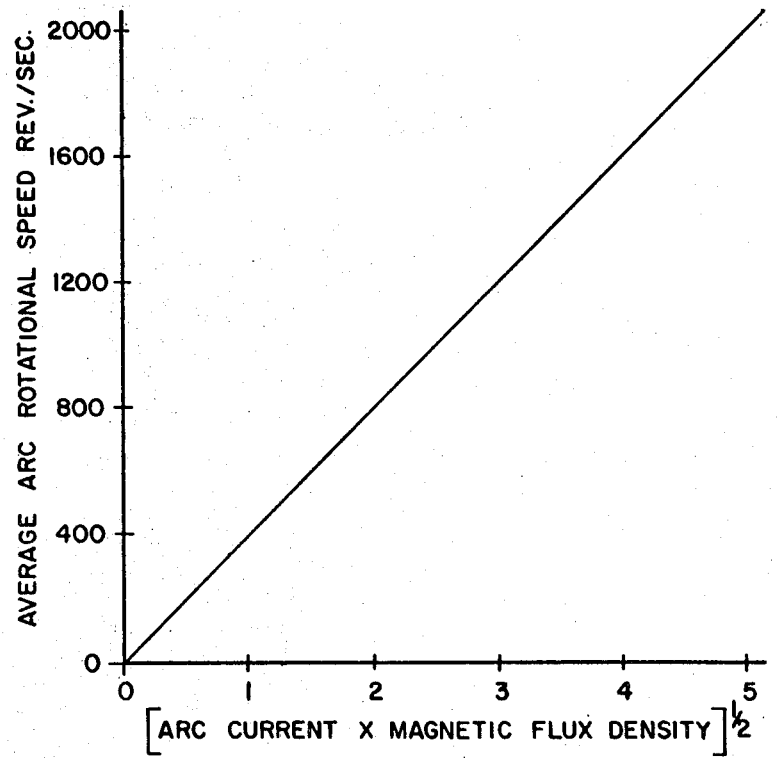
FIG. 8 is a graph of arc rotational speed as a function of arc current and magnetic flux density.

Particular reference is made now to FIG. 8, which shows a graph based upon many observed arc rotational speeds, in which average rotational speed in revolutions/sec. is plotted as a function of [arc current × magnetic flux density] ½, for an electrode mean diameter of approximately three inches.

The value of approximately 6000 gauss as the needed field strength to produce an arc velocity of 3300 ft./sec. for an arc current of 20,000 amperes may also be determined by using the graph of FIG. 8. An electrode 3 inches in diameter has a mean perimeter of approximately 9.5 inches. The required rotational speed is $$3300 \times \frac{1 \cdot 2}{9.5} = 4200 \text{ rev./sec.}$$

It is seen that the curve is linear; by extrapolation to 4200 rev./sec., the needed $\sqrt{\text{arc current} \times \text{flux density}} \cong 11$, where arc current is in kiloamperes and flux density is in kilogauss. Solving for B, a value of six kilogauss is obtained.

In accordance with the required magnetic field strength and the dimensions of the electrode I accordingly construct a coil having the necessary number of turns of the necessary wire size, the coil being positioned in a predetermined position with respect to the electrode, and I pass through the coil the required current so that the magnetomotive force of the magnetic field, corresponding to NI, is sufficient to set up a magnetic field of the required density or strength in gauss.

As shown in FIGS. 2 and 3, my construction of the electrode recognizes that at high current levels of interest here, in the range of 1,000 to 100,000 amperes, the arc breaks down into multiple spots, such that the heat density at the arc spot does not increase proportional to the total current.

In addition to transient and "average" heating from the arc spots, my electrode is also capable of operating in the presence of the heat flux from the molten metal. This flux is in the range of 100,000 to 1,000,000 B.t.u./ft.$^2$ hr. The flux from the molten metal is added to the expected flux from the arc spot and the added flux from radiation from the arc and the gases, to obtain the total heat flux which must be removed by way of the cooling fluid of the electrode.

I can also use a thin layer of steel or stainless steel a few mils thick covering the copper arcing surface in the construction of my electrode, the magnetic field coil being suitably positioned so that the presence of magnetic material in or on the electrode face member does not prevent the production of the necessary arc-moving field. If it were attempted to use steel or stainless steel instead of copper to construct the entire electrode face member, the velocity required to prevent arc spot damage would have to be higher by factors of 7 and 22 respectively, that is 23,100 and 72,600 ft./sec., respectively, for the arc parameters and environmental factors previously described. For stainless steel to produce a temperature drop of only 500 degrees between the arcing surface and the inner wall of the passageway through which cooling fluid flows, the metal would have to be only 0.006 inch thick, which is not acceptable because with such a thin metal sheath between water and arc, the structure would be mechanically inadequate and the slightest damage would result in puncture. In calculating the necessary minimum electrode diameters, if steel or stainless steel were attempted to be used for the entire electrode face member, the respective calculated minimum electrode diameters would have been greater by orders of magnitude because these materials do not cool as rapidly and because the required arc velocities would be much higher.

Where a steel coating is applied to copper, temperature drop through the coating is added to the drop through the copper in estimating the average temperature of the arcing surface.

All the numerical results obtained were based on the assumption of an arc spot of 1 mm. size with a heat flux of 16 billion B.t.u./hr. ft.² Had a different flux and arc spot size been assumed, numerical values would have been different but similar conclusions would have been obtained.

As previously stated, very high current arcs tend to form multiple paths. As a result, under normal operating conditions such as those described in connection with FIG. 4A, the point on the arcing surface may be raised by movement of an arc spot thereacross to a temperature considerably less than $\theta_2$. The electrode diameter may be reduced accordingly, or the total arc current increased accordingly. The amount that the electrode diameter may be reduced below the calculated minimum diameter, or the total current in the arc increased above the calculated value, as a result of multiple arc paths, may be determined experimentally by very simple methods.

Summarizing, in the past, nonconsumable electrodes to operate in the range up to 100,000 amperes have not been operable because of a lack of understanding of many of the important and in some cases critical relationships which I have discovered:

(1) The material of the electrode and the coolant to be employed having been chosen, the rate of flow of the coolant fluid must be sufficiently great and the thickness of the wall of the electrode between the arcing surface and the fluid must be sufficiently small to remove average heat losses.

(2) The diameter of the electrode should be maintained sufficiently small so that the heat losses from the furnace are not excessive.

(3) The diameter of the electrode must be sufficiently large, in accordance with the magnetic field strength and arc current, such that for the current density the electrode material is not evaporated at the electrode surface spot or spots.

(4) A magnetic field of sufficient intensity must be provided, in accordance with the size of the electrode on the magnitude of the current, to move the arc on the electrode sufficiently fast not to result in electrode material evaporation.

(5) A sufficient movement of the arc should be provided to lead to uniform heating of the metal desired to be melted, rather than local evaporation of the molten metal.

(6) An appropriate thickness of electrode material must be provided to prevent too high a surface temperature which would oxidize or react with the constituents in the furnace, but sufficiently thick to permit support of mechanical stresses arising from contact with the contents of the furnace.

It will be apparent that in FIGS. 4A–4C, temperatures $\theta_0$ and $\theta_1$ may vary within relatively small limits while maintaining efficient and safe operation of the electrode.

For a fuller understanding of the above described relationships, reference may be had to a work by Warren H. Giedt entitled "Principles of Engineering Heat Transfer," D. Van Nostrand Co. Inc., 1957.

Figure 9:
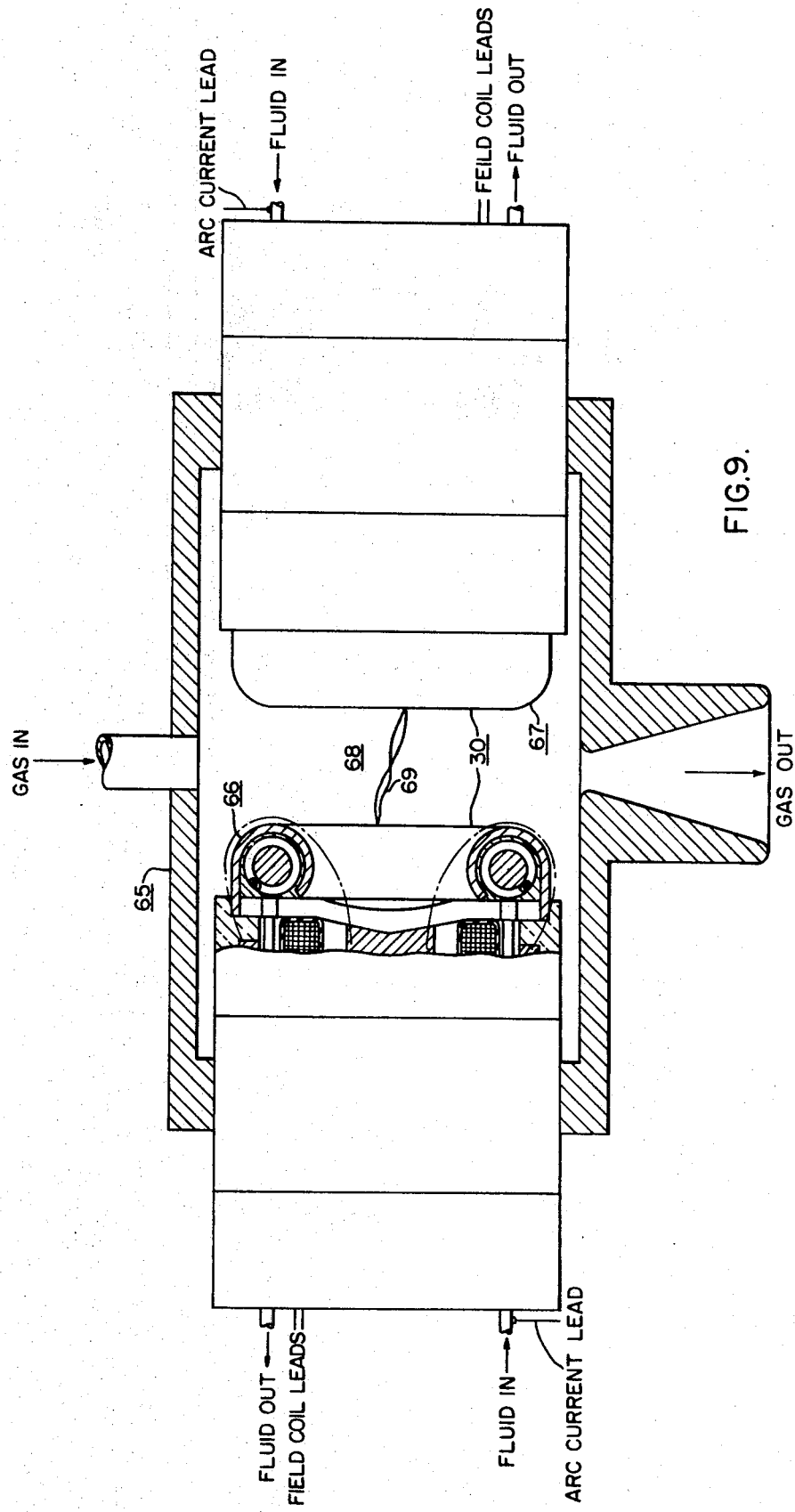
FIG. 9 shows an improved gas arc heater utilizing my improved nonconsumable electrodes.

As previously stated, my nonconsumable, electrode, while suitable for use in an arc furnace, is also adapted for use in an arc heater generally designated 65, FIG. 9, where the purpose of the apparatus is to heat air or other gas to high temperatures. In accordance with the objectives of the gas arc heater, which is to provide uniformly heated gas, in accordance with the speed of gas flow past the electrodes 66 and 67 or past or through the arc chamber 68 between two electrodes, the velocity of arc movement on the 8 inch diameter electrode necessitated by heat transfer may be increased above the 3,300 ft./sec. utilized in the foregoing calculations and description, where the rate of gas flow past the electrodes is sufficiently great that a greater speed of rotation is desirable to ensure uniform heating of the gases, that is, that the arc 69 passes through any given segment of the gas completely to provide for the uniform heating thereof.

There has been provided, then, apparatus well suited to accomplish the aforedescribed objects of the invention. The arc is moved substantially continuously in a circular path over the surface of the electrode at a rate sufficient to prevent substantial or prolonged melting of the electrode material at the spot or spots on the electrode surface where the arc impinges; water cooling of the electrode is at a rate adequate to insure a sufficiently low electrode surface temperature so that when the arc again impinges on the same spot the temperature at that spot will not be caused to rise above the melting or evaporation temperature of the electrode material.

It will be understood that electrode face member 30 is preferably composed of non-magnetic material, copper being preferred.

The electrode of my invention is nonconsumable and has a useful life many orders of magnitude greater than the carbon or graphite electrodes now generally in use.

"Surface of other polarity" as used in the claims appended hereto includes the metal as well as another electrode, or any other arcing surface, and includes arcs formed while the electrode is energized by direct current, single phase alternating current, or multi-phase alternating current.

The electrode may be used with equal facility in vertical or horizontal positions, or at any convenient angle.

Figure 10:
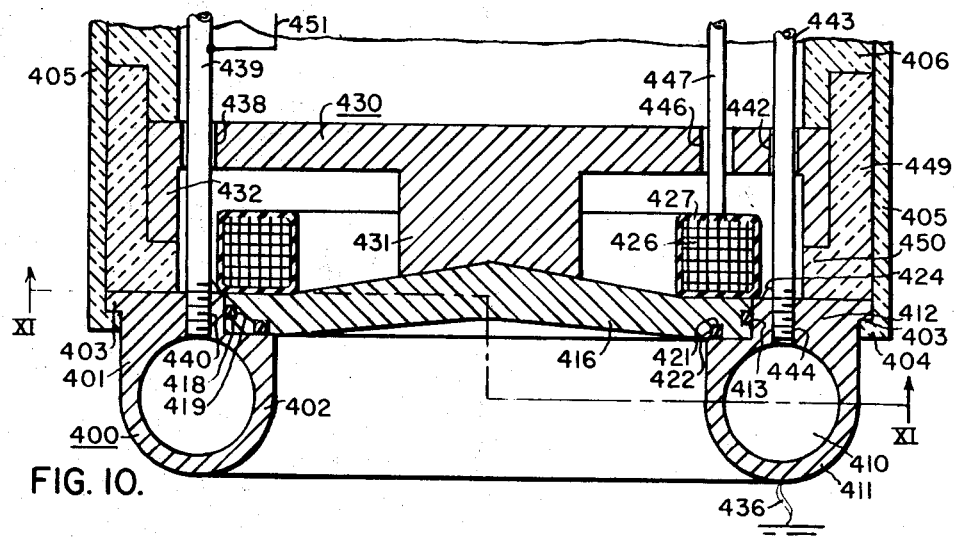
FIGS. 10, 11 and 12 show an embodiment of my invention in which the electrode including the tip and the magnetic field coil have the shape of an oblate toroid, or ellipse.
Figure 11:
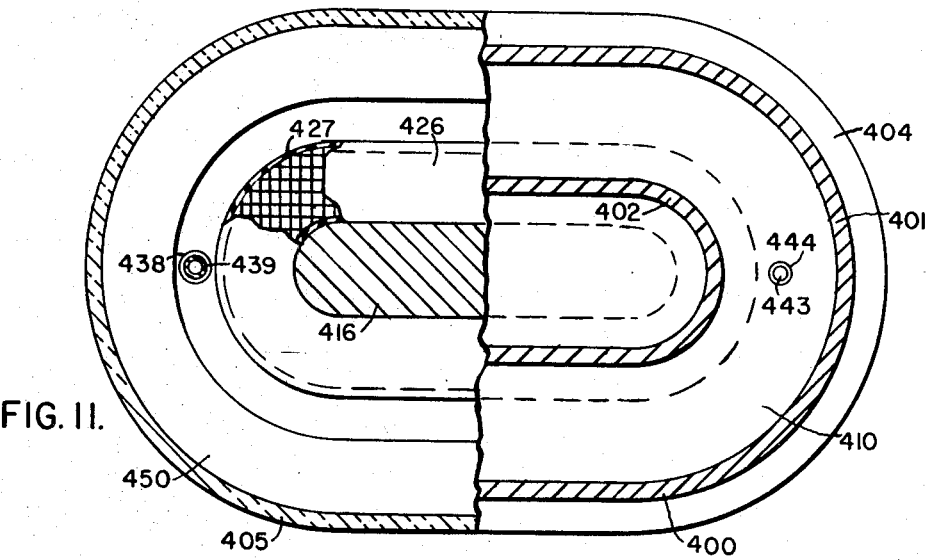
Figure 12:
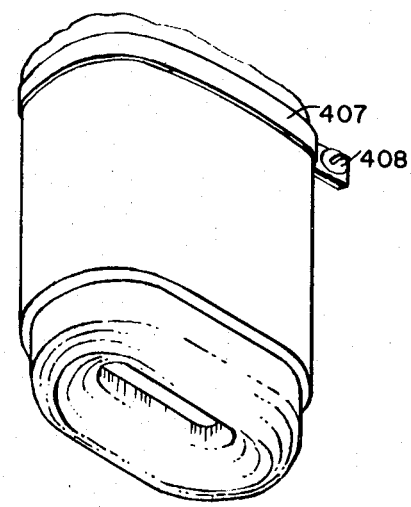

Particular reference is made now to FIGS. 10, 11 and 12 where an electrode according to an additional embodiment of my invention is shown. While the electrode tip and the magnetic field coil of FIGS. 10, 11 and 12 are deemed to be "annular" in the basic definition of this word as meaning "ring-shaped," more specifically the tip and magnetic field coil of FIGS. 10, 11 and 12 are both of the same configuration, this being that of an oval, oblate toroid, or ellipse. In FIG. 10 the tip is generally designated 400 with an outside wall elliptical in shape and of greater circumference 401, and an inside wall elliptical in shape of smaller circumference 402. The outside wall 401 has a flange portion 403 extending outwardly from the wall portion and extending around the entire tip. As will be seen more fully hereinafter, the flange 403 forms part of the support for the tip 400, flange 403 being engaged by a lip 404 on a sleeve of thermally insulating material 405. In FIG. 12, at a position so remote from the arcing surface that the clamp will withstand the heat of its environment, there is shown a clamp 407 with a clamping bolt 408 for clamping the thermally insulating sleeve 405 firmly against a further rigid sleeve of thermally insulating material 406 which may extend substantially the entire length of the electrode column or electrode supporting assembly. The aforementioned tip 400 has in addition a passageway of large diameter 410 passing therethrough and therearound for the flow of cooling fluid near the arcing surface 411 of the tip. A solid upper portion 412 has an inside wall 413 substantially oval or elliptical in shape carefully dimensioned to tightly receive the wall of an oval or elliptical disc of thermally insulating material 416 which prevents heat of radiation and convection within the furnace from reaching the interior of the electrode. A fluid tight seal is provided between disc 146 and tip portion 412 by an O-ring 418 seated in an annular groove 419. An additional O-ring 321 seated in an annular groove 422 provides further sealing.

The aforementioned portion 412 of the tip may be brazed to the inner and outer walls and also has an elliptical shaped spacing stud 424 extending from the upper surface thereof to assist in properly positioning a magnetic field coil 426 enclosed in an insulating housing 427, the field coil also having an elliptical or oblate toroid shape similar to that of the tip, the field coil resting upon the upper surface of the aforementioned closure member or disc 416 composed of thermally insulating material.

The aforementioned closure member 416 is seen to have an upper surface which tapers upwardly toward the axis of the electrode, the term "axis" being used to defined a first line through which a second line perpendicular thereto may be drawn in any radial direction with the various symmetrically disposed portions of the apparatus being equally spaced from the first line along the second line in opposite directions. Supported on the upper surface of disc 416 and maintained in position in part thereon by the aforementioned upwardly tapering surface of disc 416 is a yoke of ferromagnetic material generally designated 430 with a central downwardly extending portion 431 in contact with said disc 416 and an elliptical shaped downwardly extending flange portion 432 spaced from and extending beyond the magnetic field coil 426 and preferably extending downwardly in an axial direction at least to a position where the end of the flange portion 432 axially overlaps at least a portion of the magnetic field coil 426. The aforementioned yoke generally designated 430 provides a low reluctance path for the magnetic field lines of the magnetic field created by coil 426, assisting in the creation of a strong magnetic field adjacent the arcing surface 411 and transverse to the arcing surface and transverse to the arc path, the arc being shown at 436 and extending in a generally axial direction to a surface of opposite polarity, not shown for convenience of illustration.

The aforementioned yoke 430 has three carefully positioned apertures therethrough, one of these being shown at 438 through which passes a tube 439 composed of electrically conductive material, and which has the lower end thereof threaded at 440 in threaded engagement with the threads of a bore passing through the upper portion 412 of the tip so that the tube 439 opens into the passageway 410 in the tip.

An additional passageway through the yoke member 430 is seen at 442 through which extends another tube preferably of electrically conductive material 443, tube 443 being threaded at 444 and in threaded engagement with the threads in a circular bore in the aforementioned upper portion 412 of the tip 400 so that the tube 443 opens into the passageway 410 in the tip preferably at a position substantially diametrically opposite to that of tube 439. Tubes 439 and 443 provide a fluid inlet and fluid outlet or vice versa for bringing a cooling fluid to the passageway 410 in the tip and conducting fluid therefrom after it has flowed through dual paths in the tip each extending substantially halfway around the tip.

Lead 451 connected to conduit 439 symbolizes means for connecting tip 400 to a source of potential.

The third aforementioned aperture in yoke 430 is seen at 446 through which passes a conduit 447 containing insulated electrical leads for connection to a source of potential to energize the aforementioned field coil 426.

Particular reference is made now to FIG. 11, a section through the lines XI—XI of FIG. 10. The elliptical or oblate toroid configuration of the tip 400 and field coil 426 are more clearly shown in FIG. 11. It will be understood that my invention is not limited to an ellipse having the relative short and long dimensions shown in FIG. 11, but that a convenient choice of dimensions could vary within substantial limits.

In assembling the electrode of FIG. 10, the magnetic field coil and housing 427 with conduit 447 attached are inserted in the yoke with conduit 447 passing through the aforementioned aperture 446. Thereafter the disc or closure member 416 is placed in abutting relationship to the yoke 430 and thereafter the sleeve of insulating material 449 is placed in position around the outside of downwardly extending flange portion 432 of the magnetic yoke with the lip portion 450 of sleeve 449 in position to support the bottom surface of the flange portion 432. Thereafter the tip generally designated 400 is placed in position, the tubes 439 and 443 are inserted through apertures 438 and 442 respectively from above and tightly threaded into portion 412 of the tip at 440 and 444 respectively. Thereafter the sleeve of insulating material 405 is placed in position with the lip 404 thereof engaging the flange 403 on the outside wall 401 of the tip, the insulating sleeve 405 as aforementioned being clamped as by clamp 407 and bolt 408, FIG. 12, at some position farther upward on the electrode and assisting in securing the tip in position on or in the electrode.

Means which may be similar to the respective means shown in FIG. 1, are provided for adjusting the current in the arc 436, the current in coil 426 and thereby the strength of the magnetic field, and the mass flow rate of cooling fluid in passageway 410.

Particular reference is made to FIG. 12 where a perspective view of the electrode shown in FIGS. 10 and 11 is shown.

Other convenient means, in addition to those shown, or as a substitute for those shown, may be employed for securing the tip to the supporting column.

The electrode of FIGS. 10 through 12 is especially suitable for use in heating any surface or material where it is desirable to heat an area which is of greater length in one dimension than it is in the other. The electrode is especially suitable for use in slab remelting apparatus for the removal of defects therefrom such as that described in the copending application of Daniel A. Maniero, George A. Kemeny and Armin M. Bruning for "Method and Apparatus for Removing Defects from Slabs and Blooms of Steel and Other Metals," Ser. No. 817,283, filed Apr. 15, 1969, where my electrode is employed but not claimed per se, said application being assigned to the assignee of the instant invention, said application being a continuation of application Ser. No. 439,832, filed Mar. 15, 1965, further identified by Westinghouse Electric Docket No. 36,560.

Figure 5:
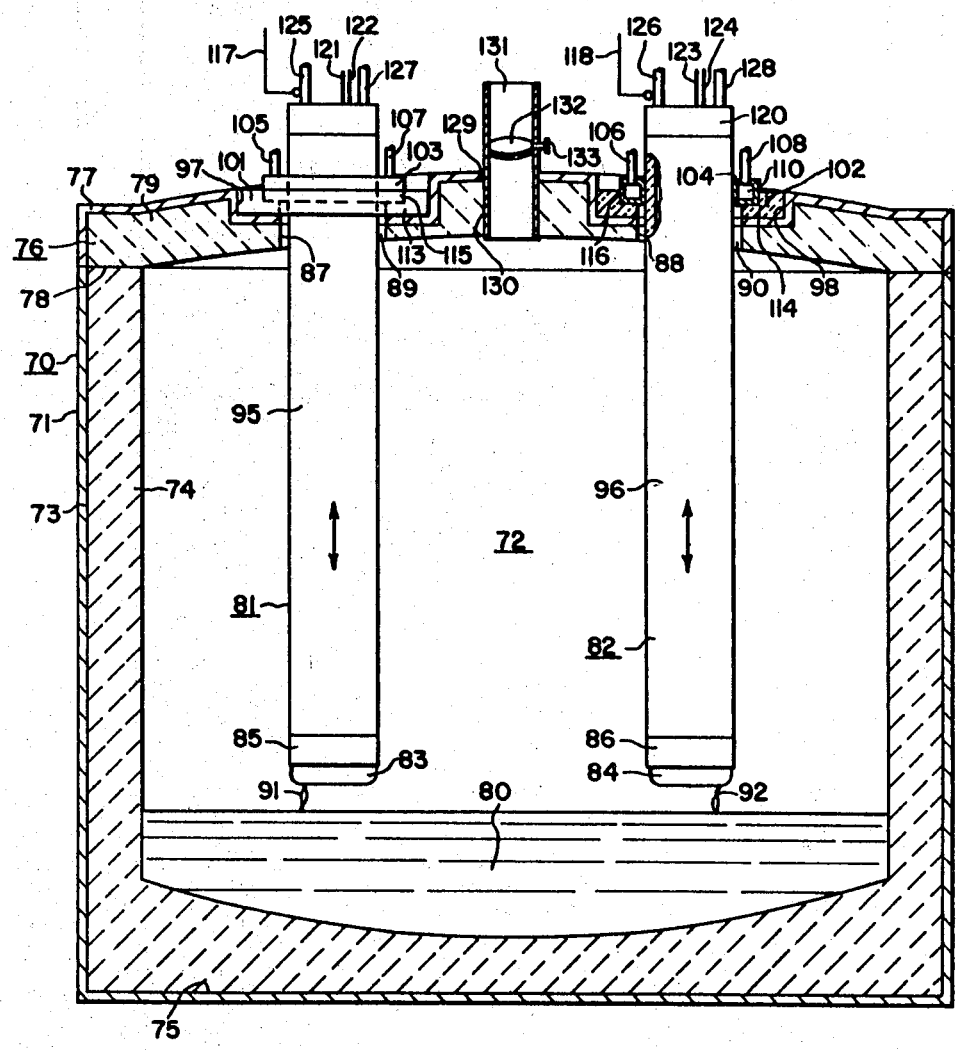
FIG. 5 is a cross-sectional view of a new and improved electric arc furnace according to my invention.

Particular reference is made now to FIG. 5. As previously stated, one of the objects of the invention is to provide a new and improved furnace made possible by and utilizing the aforedescribed nonconsumable electrode. In prior art electric furnaces it has frequently been the practice to leave a considerable space between the outer wall of the electrode and the inner wall of an annular or other shaped bore through the top of the furnace in order to provide the necessary electrical insulation between the electrodes and the metallic shell forming part of the top of the furnace. These openings have in effect constituted undesirable flues through which a considerable portion of the heat generated in the furnace was lost, and which furthermore made the regulation of the temperature of the furnace difficult, and in some cases, because of the drafts, made it impossible to obtain substantially uniform heat distribution in the melt. These and other disadvantages followed from the necessary structure of the prior art.

In FIG. 5, my furnace is generally designated 70, having a wall 71 including a metallic shell 73 and an insulating wall portion 74 composed of ceramic or other heat resistant material, and having a bottom 75, the insulating wall 74 being if desired cylindrical in shape and enclosing a furnace chamber generally designated 72. The bottom surface forming the chamber 72 is seen to be curved in cross-section, as shown, and the melt 80 may consist of any one of a large number of substances or mixtures in accordance with the use to which the furnace is to be put. Wall portion 74 terminates at its upper edge in an annular surface 78 upon which is mounted a top cover generally designated 76 having a top shell portion 77 of metal or other suitable material and an insulating top portion 79 of thermally insulating material.

For convenience of illustration, two electrodes generally designated 81 and 82 are shown but it should be understood that three electrodes connected to a three phase source of alternating current potential could be employed if desired. If desired, the three electrodes could be placed in a substantially equilateral triangular pattern. Electrodes 81 and 82 extend through annular bores or openings 87 and 88 respectively in the top cover generally designated 76. Electrodes 81 and 82 have electrode face members 83 and 84 respectively, with ceramic tubes or sleeves 95 and 96 and ceramic sleeve extensions 85 and 86 adjacent thereto respectively, in accordance with the description of the nonconsumable electrode of FIG. 1, and the symbolical arcs 91 and 92 are shown taking place between electrodes 81 and 82 and the melt 80, which is conductive to at least a certain degree.

It is seen that the top 76 has two spaced recesses 97 and 98 in the cover, these recesses being circular in shape and in substantial axial alignment with the aforementioned bores or openings 87 and 88 through the cover. In each of these recesses 97 and 98 there is disposed a ring member composed of a highly heat resistant material such as a ceramic, these rings being designated 101 and 102, the rings having annular grooves 115 and 116 therein respectively forming inner portions of reduced thickness 113 and 114 respectively. The ceramic ring 101, which is seen to have an inside diameter such that an annular space of the width of space 89 exists between the outer surface of electrode 81 and the inner surface of the ring, has mounted in the annular groove 115 thereof a water-cooled ring 103 composed of a material which is highly heat conductive, such as copper, having water inlet 105 and water outlet 107 connected thereto at substantially diametrically opposed points to form two semi-circular paths for the flow of a cooling fluid through the water-cooled ring. It is seen that the diameter of the ring 103 is such that the inner surface thereof snugly fits the outer surface of the ceramic shell 95 of electrode 81 so that substantially no heat escapes around the electrode.

The water-cooled ring 104 of electrode 82 is shown in cross-section, and it is seen that the circular or annular passageway 110 therethrough may be square in cross-section if desired, water inlet 106 and outlet 108 communicating with the passageway 110, it being provided that water-cooled ring 104 fits snugly in the annular groove 116. The space 90 may be substantially equal in dimensions to space 89, and it is seen from a study of the water cooled ring 104 that the inner wall of the ring fits snugly against the ceramic shell 96 of the electrode 82 so that no heat is lost to atmosphere, heat brought to ring 104 primarily by radiation or convection being transferred to the cooling fluid.

As aforementioned, heat of radiation and convection passes through the annular spaces 80 and 90, which are necessary to provide for free translational movement of the electrodes as the level of the melt changes, requiring adjustment of the axial position of an electrode to maintain a desired distance between melt and electrode face member. This heat of radiation and convection impinges against the water-cooled lower surface of the respective copper ring, and the intense heat thus received by this portion of the ring is transmitted by the fluid passing continuously through the semi-circular paths of the ring 104, for example.

Electrodes 81 and 82 are seen to have cap members 119 and 120 respectively, electrode 81 having leads 121 and 122 for bringing an energizing potential to the field coil therein, electrode 82 having leads 123 and 124 for bringing an energizing potential to the field coil therein, the electrodes 81 and 82 having fluid inlet conduits 125 and 126 respectively and outlet conduits 127 and 128 respectively.

Aligned apertures 129 and 130, in the metallic shell 77 and the cover portion 79 of thermally insulating material respectively, have disposed therein a flue member 131 containing an adjustable damper 132 with the handle 133 for adjusting the position of the damper.

Rings 103 and 104 may support electrodes 81 and 82 at desired distances from the melt. They are secured or attached to the electrodes, which are thereafter slipped through the cover, the rings resting in grooves 115 and 116.

Ceramic rings 101 and 102 may be thought of as forming heat resistant linings for the apertures through the cover.

Damper 132 and flue 131 are symbolic and it will be understood that remotely controlled damper apparatus may be provided in a number of convenient and conventional ways.

Material may be fed to the melt through the flue 131, if desired.

Conventional means may be provided for tilting the furnace and opening the furnace when it is desired to pour melt therefrom.

Some of the advantages in simplicity and economy provided by my furnace can be seen by comparing my FIG. 5 with the figure on page 325 of the "Metals Handbook," 1948 edition, published by the American Society for Metals, Cleveland, Ohio, in an article by Soler and Gill entitled "The Basic Electric-Arc Process of Steel Melting." The elaborate electrode holders and motor for electrode control are shown. The electrodes are graphite or amorphous carbon.

Figure 6:
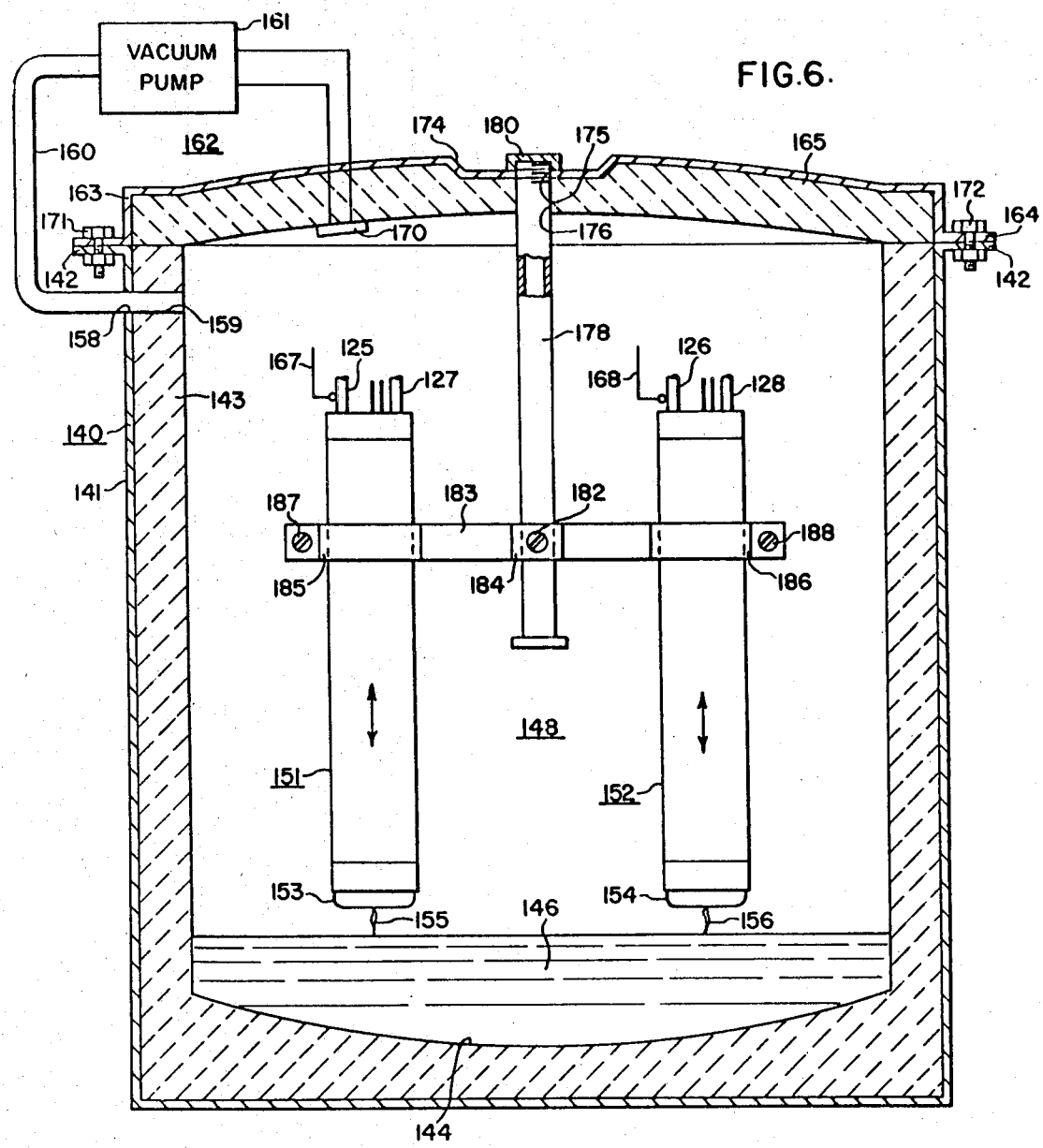
FIG. 6 is a cross-sectional view through a new and improved vacuum furnace according to my invention.

Particular reference is made now to FIG. 6, where an embodiment of an improved vacuum furnace employing my new and novel nonconsumable electrode is shown. As will be readily understood, where a consumable electrode composed of carbon or graphite is used in a vacuum furnace, the necessity for constantly readjusting the position of the electrode as the arcing end thereof is consumed, to maintain a substantially constant arc distance between the electrode and the melt, without breaking the seal of the furnace and destroying the vacuum which exists therein imposes great problems and necessitates very complicated structure for positioning the electrode. The nonconsumable electrode of my invention offers apparent advantages since adjustment of the position of the electrode is necessitated, if at all, only when the level of the melt in the furnace changes. This usually occurs only when melt is poured, or material added to the melt. In FIG. 6, the furnace generally designated 140 has an outer metallic shell or wall portion 141 with a flange 142 at the top thereof. The inner wall 143, composed of thermally resistive material, has the bottom thereof curved at 144, the furnace containing a melt 146, the furnace chamber generally designated 148 having disposed therein electrodes generally designated 151 and 152 having electrode face members 153 and 154 with arcs 155 and 156 therefrom respectively to the melt 146. The melt has at least a certain conductivity. Two electrodes are shown for convenience of illustration, but it will be readily understood that three electrodes connected to a three phase source could be employed if desired. Leads 167 and 168 connected to the water conduits shown bring potential and current to the respective electrode face members for forming the respective arcs, leads 167 and 168 corresponding to the energizing leads 117 and 118 of FIG. 5, and lead 22 of FIG. 1.

The metallic shell 141 and the thermally resistive wall 143 are seen to have aligned openings 158 and 159 therein respectively through which pass the conduit 160 connected to a vacuum pump shown in block form at 161.

The furnace 140 is covered with a top portion generally designated 162, having a metallic shell 163, with an annular flange 164 and a thermally insulating portion 165. Flange 164 has a plurality of bores at spaced intervals around the periphery thereof in alignment with a plurality of bores at spaced intervals around the aforementioned flange 142, in which are disposed a plurality of bolts for securing the top 162 to the remainder of the furnace, two of these bolts being shown at 171 and 172.

In the illustrative embodiment shown, the top generally designated 162 is seen to have a recessed portion 174 with bore 175 therein in alignment with bore 176 in the thermally insulating top portion in which is firmly mounted a pedestal or hollow support column 178, the upper end of the support column or pedestal 178 being threaded, to which is secured a threaded closure member or cap 180. The cap 180 is removable for feeding material into the furnace through the hollow pedestal, whereafter the cap may be secured by threading it to the upper end of the pedestal. Sealing means, such as a rubber gasket or O-ring, not shown for convenience of illustration, may be provided for insuring that the interior of the furnace is vacuum sealed. In like manner, a rubber gasket or other sealing means may be disposed between the flanges 164 and 142.

Slidably mounted on the pedestal 178 and having its position adjustable thereon by set screw means 182 is a cross bar 183, having the collar portion 184 slidable on the pedestal 178. Cross bar 183 is seen to have additional collar portions 185 and 186 adapted to snugly fit the electrodes 151 and 152 which, after their position is adjusted as desired, are clamped in place by tightening screws 187 and 188.

Elements 178, 182, 183, 187 and 188 are preferably made of highly heat resistant material, or metal having a very high melting point.

It will be readily understood that any convenient means, not shown, may be provided for exiting the power leads 167 and 168 from the vacuum chamber 148. In like manner, the water inlet and water outlet conduits of the respective electrodes may be taken out of the furnace in any convenient sealed manner, as may be the leads for energizing the field coils adjacent the electrode face members 153 and 154.

It will be readily understood that three pedestals, each corresponding to pedestal 178, may be provided if desired to provide greater freedom for individually adjusting the positions of three electrodes in a three-phase system.

Any convenient means may be provided for tilting the furnace 140 and pouring melt therefrom at the conclusion of the electric arc heating process, or for taking melt therefrom in any other desired manner.

It will be understood that the vacuum pump system of FIG. 6 includes convenient pressure sensing means, shown generally at 170, connected to the vacuum pump for regulating the pressure in the chamber 148 at any desired value, in accordance with well known vacuum technology.

The vacuum furnace in FIG. 6 then illustrates an improved vacuum furnace in which the complicated apparatus for positioning electrodes which are continuously consumed during the heating process, without destroying the vacuum, has been eliminated, the resulting simplification of the structure resulting in a substantial reduction in cost of the vacuum furnace. The expense of eliminating contamination of the melt by material from the electrode, by constructing an electrode made of the same material as that in the furnace, is avoided.

Figure 7:
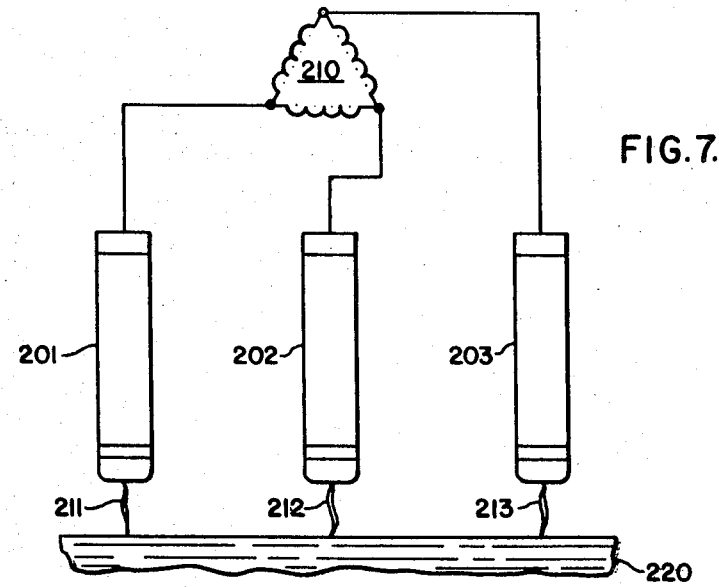
FIG. 7 shows a furnace according to my invention utilizing three electrodes energized from a three phase source.

In FIG. 7, three nonconsumable electrodes 201, 202 and 203 are shown connected to a three-phase source 210, forming three arcs 211, 212 and 213 to a melt 220 having at least a certain conductivity.

My invention offers an additional advantage afforded fully by a three-electrode furnace, and to some extent by a single electrode furnace. The arc from my electrode, rotating around the arcing surface reaches substantially all melt material, and it is unnecessary to rotate the melt or to place a stirring coil in the bottom of the furnace.

The invention includes the use of a permanent magnet to set up the magnetic field at the arcing surface of the electrode face member.

The word "conductive" when used herein and in the claims appended hereto without a modifier means electrically conductive.

Materials for the sleeves 12 and 14 of heat resistant material and member 48 of ferromagnetic material preferably have closely similar temperature coefficients of linear expansion.

Suitable hydraulic insulators, not shown for convenience of illustration, connect conduits 21 and 29, FIG. 1, to the remainder of the fluid system which may include flexible hose, the hydraulic insulators isolating the electrode electrically from the fluid supply apparatus.

In the embodiment of FIG. 6, it will be understood that conduits 125, 127, 126 and 128 are electrically insulated from metallic shell 163 at the points where they pass therethrough.

Temperature $\theta_1$ may be referred to in the claims as the "safe" temperature, since it is the temperature the arcing surface at a particular point or spot thereon should return to if repeated revolutions of the arc are not to result in abnormal and destructive temperature rises.

In the claims, the temperature rise of any point on the arcing surface while the arc spot is moving over it, such as from $\theta_1$ to $\theta_2$ in time $T_1$ to $T_2$ may be referred to as the "instantaneous temperature rise."

I have described my invention with respect to an electrode having an annular or ring-shaped electrode tip and a field coil with a shape similar to that of the tip, and have shown generally circular as well as elliptical or oblate toroid shaped tip and coil configurations, and such shapes permit the maximum length of the arc path while reducing the area of the electrode surface exposed to heat flux toward the minimum area required for heat flux removal in accordance with teachings hereinbefore. My invention includes other configurations which provide a closed arc track.

The term "nonconsumable electrode" as employed in certain of the claims appended hereto refers to an electrode constructed according to the teachings of FIGS. 1–4 inclusive.

The term "deterioration" as employed in certain of the claims appended hereto means any substantial loss of metal resulting from melting, vaporization, or other cause. The term "consumed" may have a similar meaning.

The term "erosion rate" is a measure of the loss of material in micrograms/amp. sec.

The term "original-mass related erosion rate" is the percentage of usable copper lost per hour. "Usable copper" is that copper which may be lost without reducing the thickness of the wall between arcing surface and water surface below a minimum thickness required for mechanical strength and safety.

"Area-related erosion rate" is measured in micrograms/ amp. sec./sq. in. (area of the arc track).

The foregoing drawings and written description are ilustrative only and are not to be interpreted in a limiting sense.

I claim as my invention:

1. A nonconsumable electrode comprising, in combination, annular electrode face means composed of conductive material of a predetermined thermal conductivity and providing an arcing surface with a closed arc track of a predetermined mean length along said surface, a supporting structure composed at least partially of electrically conductive material secured to and supporting the electrode face means and making electrical connection with the electrode face means, magnetic field generating means including a field coil mounted within the electrode near the electrode face means, means including means secured to at least one of the supporting structure and electrode face means supporting the field coil in position within the electrode, the conductive portion of the supporting structure being adapted to have a terminal of one polarity of a source of electrical potential connected thereto for producing an arc of a selected current value from the electrode face means to a surface of opposite polarity, the magnetic field coil being so dimensioned with respect to the electrode face means and having its magnetic poles so oriented thereto as to produce a field with field lines extending substantially transverse across the arcing surface and transverse to the current path in an arc from said arcing surface for exerting a force on the arc which causes the arc to move substantially continuously in repetitive paths in said track, the electrode face means having at least one passageway therein extending substantially around the entire electrode face means near the arcing surface thereof for the flow of cooling fluid with a predetermined average wall thickness between arcing surface and fluid surface, the passageway having at least a predetermined minimum cross-section in accordance with the pressure on the fluid therein whereby fluid flows therethrough at a predetermined mass flow rate to thereby remove heat flux from the arcing surface at a predetermined heat flux removal rate substantially equal to the total area of the arcing surface times the heat flux removal rate per unit area which is a function of the thermal conductivity of the material of the electrode face means and a function of the arc current, the electrode face means providing an arcing surface with an area having a lower limit critically related to the value of the arc current and the rate of heat flux removal, the supporting structure including means forming a fluid passageway opening into the passageway in the electrode face means and of a sufficient cross-sectional area for bringing a cooling fluid to the electrode face means at at least said mass flow rate and including means forming an additional fluid passageway opening into the passageway in the electrode face means for conducting fluid from the tip at a rate permissive of the first-named mass flow rate, the arcing surface of the electrode face means having an average surface temperature which is a function of the area, a function of the wall thickness, a function of the arc current, a function of the thermal conductivity of the material, and a function of the heat flux removal rate, the strength of the magnetic field generated by the field coil being adjusted to at least a minimum value which exerts a sufficient force on the arc in accordance with the value of the arc curent whereby an arc spot on the arcing surface is caused to move over said arcing surface at a velocity great enough in accordance with said average surface temperature to prevent substantial evaporation of material from the electrode face means at any arc spot site thereon due to a temperature rise above said average surface temperature sufficient to carry the temperature at the site of the arc spot above the melting temperature of the material of which the electrode face means is composed for a prolonged period of time.

2. An electrode according to claim 1 in which the electrode face means is elliptical and the magnetic field coil is elliptical.

3. An electrode according to claim 1 wherein the supporting structure includes in addition a yoke of ferromagnetic material with a portion thereof remote from the electrode face means extending radially beyond the magnetic field coil around the entire periphery thereof and a generally central portion extending axially from the first-named portion toward the electrode face means to provide a low reluctance path for magnetic field lines and increase the portion of the total magnetomotive force available to set up a magnetic field at the arcing surface.

4. An electrode according to claim 1 in which the electrode face means is generally toroidal in configuration with an opening therethrough bounded by the toroid.

5. An electrode according to claim 4 including in addition a disc composed of refractory material interposed between the electrode face means and the remainder of the supporting structure and closing said opening at the side thereof adjacent the supporting structure for preventing heat of radiation and convection from reaching the supporting structure through said opening.

6. An electrode according to claim 5 in which the disc of refractory material forms the means for supporting the magnetic field coil in position within the electrode.

7. An electrode according to claim 5 in which the refractory material is a ceramic.

8. An electrode according to claim 3 in which the first named portion of the yoke of ferromagnetic material is additionally characterized as having a plurality of openings therethrough, in which the means of the suporting structure forming a fluid passageway and the means forming an additional fluid passageway pass through at least two of said openings to the electrode face means, and in which the magnetic field coil has energizing leads passing through a different one of said plurality of openings.

9. An electrode according to claim 7 in which a portion of the supporting structure enclosing at least an additional portion of the supporting structure adjacent to the electrode face means is composed of refractory material to prevent heat of convection and radiation from reaching the additional portion.

10. An arc electrode having an increased useful life as a result of a rate of erosion of material by arc action which continuously diminishes as the time duration of the arc increases and a parameter of the electrode varies from an original value toward a final limiting value less than the original value, comprising in combination, an annular fluid cooled electrode tip composed of a preselected material and having an arcing surface providing a closed track for a moving arc, the tip having a fluid passageway therein of at least a predetermined cross-section extending around the entire tip, the wall of the tip having a first predetermined original thickness between arcing surface and fluid surface, an electrode column secured to and supporting the tip, the electrode column including field channeling means for conducting fluid to the tip and other fluid channeling means for conducting fluid from the tip, the fluid channeling means and other fluid channeling means both opening into the fluid passageway in the tip, the electrode tip being adapted to be electrically connected to a terminal of one polarity of a source of potential to produce and sustain an arc from the tip to a surface of opposite polarity, the heat flux at the arcing surface being a function of the arc current and including integrated arc spot losses and heat of radiation and convection, a temperature differential existing between the arcing surface temperature and the temperature of the fluid surface, said temperature differential being a function of the thermal conductivity of the material of the tip and a function of the instant thickness of said wall, the arcing surface having a sufficient area and the mass flow rate of cooling fluid through the passageway in the tip being sufficiently great whereby heat flux may be removed from the tip at a rate which maintains the arcing surface at an average temperature not exceeding a predetermined value, said average temperature being the sum of said temperature differential and a fluid temperature having an upper limit set by substantially that temperature at which the fluid boils, a magnetic field coil mounted in the electrode near the arcing surface and secured in position therein and generating a magnetic field at the arcing surface with field lines extending generally radially across the arcing surface around the entire perimeter of the tip, the magnetic field lines being substantially perpendicular to the arc path and exerting a force on the arc which causes the arc to move substantially continuously in repetitive paths around said closed track, the arcing surface of the tip undergoing an instantaneous temperature rise to a peak temperature at the site of an arc spot which is a function of the arc current and a function of the dwell time of the arc spot at said site, the upper limit of the original average arcing surface temperature being selected in accordance with the melting temperature of the material of the tip, and the strength of the magnetic field being sufficiently large whereby the dwell time is such that the instantaneous temperature rise at the site of the arc spot does not increase the temperature at said last-named site substantially above the melting temperature of the material for an extended period of time thereby limiting the rate of erosion of material from the arcing surface, the wall between arcing surface and fluid surface having a final thickness over any portion of the area thereof after erosion of material therefrom which has a lower limit set by requirements of mechanical strength and safety, the rate of erosion of material from the tip continually decreasing as the time duration of the arc increases as a result of a diminishing temperature differential between arcing surface and fluid surface as the thickness of the wall decreases because of erosion of material therefrom, the diminishing temperature differential causing a diminishing average arcing surface temperature and a diminishing peak temperature at the site of the arc spot thereby continuously decreasing the erosion rate and prolonged the life of the electrode.

11. An electrode according to claim 10 in which the tip is elliptical and the magnetic field coil is elliptical.

12. An electrode according to claim 10 in which the tip has a cross-section with two outside wall portions one of relatively large circumference with respect to the other, in which the arc is produced by alternating current, and in which the arc track is sufficiently wide to provide for arc paths resulting from periodic variations in the force on the arc as the current in the arc varies during each alternation.

13. An electrode including a supporting column with at least two fluid passageways therein, an electrode tip secured to the supporting column and forming an arcing surface with a closed track thereon on which an arc may move, the electrode tip having a fluid passageway therein for the flow of cooling fluid and extending through substantially the entire tip, both of the fluid passageways in the supporting column opening into the passageway in the tip for bringing fluid to the tip and conducting fluid therefrom, the tip being adapted to be electrically connected to a terminal of one polarity of a source of potential to produce an arc therefrom to a surface of opposite polarity, the electrode including a magnetic field coil mounted and secured in position therein oriented with respect to the tip whereby field lines of the magnetic field generated thereby are transverse to the arc current path and a force is exerted on the arc which causes the arc to move, the electrode having a plurality of decisive structural parameters including the cross-section of the fluid passageway in the tip, the thermal conductivity of the material of the tip, the average wall thickness between arcing surface and fluid surface, the area of the arcing surface, and the mean circumference of the closed track, the electrode while operated having a plurality of decisive operating parameters including the value of the arc current, the strength of the magnetic field, and the pressure in the fluid in the passageway in the tip, all of the parameters having values selected with respect to each other whereby the instantaneous temperature at the site of an arc spot does not reach a sufficient value for a sufficient period of time to cause substantial loss of material from the tip.

14. An electrode according to claim 13 in which the tip is elliptical and the magnetic field coil is elliptical.

15. The method of producing and sustaining a substantially continuous arc suitable for heating which comprises, forming an arcing surface having at least a predetermined area composed of electrically conductive material, creating a potential difference between the arcing surface and a surface of opposite polarity to produce an arc of a selected current therebetween, cooling the arcing surface to a predetermined average temperature by substantially continuously removing heat flux therefrom and transferring the heat to a continuously moving stream of water passing in heat transfer relationship to the arcing surface, and substantially continuously moving the arc over the arcing surface at at least a predetermined speed in accordance with the value of the arc current whereby the dwell time of the arc spot at any location on the arcing surface is insufficient to raise the temperature of the material at said location from said average temperature to a temperature at which substantial loss of material occurs.

16. The method of producing and sustaining a substantially continuous arc suitable for heating which comprises, forming an arcing surface composed of electrically conductive material, creating a potential difference between the arcing surface and a surface of opposite polarity to produce an arc of a selected current therebetween, transferring heat flux substantially continuously from the arcing surface to a moving stream through a wall of predetermined thickness composed of a material having a preselected thermal conductivity to maintain a selected average arcing surface temperature, creating a magnetic field at the arcing surface and adjusting the strength of the magnetic field in accordance with the value of the arc current whereby the arc is substantially continuously moved over the arcing surface at a speed which limits the temperature rise at any point thereon due to the arc spot to a temperature below that at which substantial loss of material from the arcing surface occurs.

17. The method of producing and sustaining a substantially continuous arc suitable for heating which comprises forming an arcing surface composed of electrically conductive material, creating a potential difference between the arcing surface and a surface of opposite polarity to produce an arc of a selected current therebetween, cooling the arcing surface to a predetermined average temperature by substantially continuously transferring heat flux therefrom to a stream of moving fluid, and generating a magnetic field with field lines so oriented with respect to the arc that a force is exerted on the arc which substantially continuously moves the arc over the arcing surface at at least a predetermined speed in accordance with the value of the arc current which keeps the temperature rise at any point thereon due to the arc spot below a temperature at which substantial loss of material from the arcing surface occurs.

18. An electrode for use in an arc furnace comprising, in combination, means forming an electrode column and a fluid cooled electrode tip forming an arcing surface detachably secured to said column, said tip having a substantial area in cross-section and a contour defining a closed arc track, at least a portion of the contour being curved, said electrode column including at least a conductive portion electrically connected to the tip for bringing current to the tip to produce and sustain an arc therefrom, the electrode tip having at least one passageway therein for the flow of cooling fluid near the arcing surface, said column including fluid channeling means for bringing fluid to the passageway in the tip and other fluid channeling means for conducting fluid from the passageway in the tip, both of said channeling means opening into the fluid passageway in the tip, a magnetic field coil having a contour similar to that of the tip mounted in the electrode adjacent the tip and substantially uniformly spaced therefrom, means securing the field coil in position within the electrode, and lead means passing through the electrode column for bringing an energizing current to the coil, said field coil being so oriented with respect to the arcing surface that while energized it sets up a magnetic field at the arcing surface transverse to the arc current path which exerts a force on the arc and causes the arc to move substantially continuously over the arcing surface.

19. A nonconsumable electrode comprising, in combination, annular electrode face means composed of conductive material and providing an arcing surface with a closed arc path of a predetermined length along said surface, annular magnetic field producing means, the electrode face means having at least one passageway therein near the arcing surface thereof for the flow of a cooling fluid at a predetermined mass flow rate to thereby remove heat flux from the arcing surface at a predetermined rate, a supporting structure composed at least partially of conductive material secured to and supporting the electrode face means and making electrical connection with the electrode face means, the supporting structure including means forming a fluid passage opening into the passageway in the electrode face means for bringing cooling fluid to the electrode face means, the supporting structure including other means forming an additional fluid passage opening into the passageway in the electrode face means for conducting fluid from the electrode face means, the conductive portion of the supporting structure being adapted to have a source of electrical potential connected thereto for producing an arc of a selected current value from the electrode face means, means securing the magnetic field producing means in the supporting structure in predetermined position with respect to the electrode face means whereby the magnetic field includes a strong component extending substantially radially transverse to the arcing surface and extending substantially perpendicular to the arc path whereby a force is exerted on the arc which causes the arc to move substantially continuously in said closed arc path at a velocity great enough to prevent substantial evaporation of material from the electrode face means at any point thereon due to a substantially instantaneous temperature rise from a first temperature to a second temperature while the arc spot is moving over said point and at a velocity small enough in accordance with the length of the arc path to prevent the arc spot from returning to the same point on the arcing surface after one traverse of the arc path before the arcing surface at said point has had time to cool to substantially the first temperature, and heat shield means including two portions both composed of refractory material, one portion being substantially cylindrical and secured to the remainder of the supporting structure and enclosing a portion of the supporting structure, the other portion being a substantially circular disc secured to the supporting structure and closing the central aperture of the annular electrode face means on the side thereof adjacent the supporting structure.

References Cited

UNITED STATES PATENTS

| | | | |
|---|---|---|---|
| 501,825 | 7/1893 | Coffin | 13—9 |
| 2,472,851 | 6/1949 | Landis et al. | 219—123 |

BERNARD A. GILHEANY, Primary Examiner

R. N. ENVALL, JR., Assistant Examiner

U.S. Cl. X.R.

219—123